(12) United States Patent
Takamoto

(10) Patent No.: US 11,780,442 B2
(45) Date of Patent: Oct. 10, 2023

(54) SOUND SOURCE ESTIMATION SERVER, SOUND SOURCE ESTIMATION SYSTEM, SOUND SOURCE ESTIMATION DEVICE, AND SOUND SOURCE ESTIMATION METHOD

(71) Applicant: TOYOTA JIDOSHA KABUSHIKI KAISHA, Toyota (JP)

(72) Inventor: Satoshi Takamoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 24 days.

(21) Appl. No.: 17/645,144

(22) Filed: Dec. 20, 2021

(65) Prior Publication Data

US 2022/0194382 A1 Jun. 23, 2022

(30) Foreign Application Priority Data

Dec. 23, 2020 (JP) ................................. 2020-214363

(51) Int. Cl.
*B60W 30/19* (2012.01)
*B60W 40/105* (2012.01)

(52) U.S. Cl.
CPC .......... *B60W 30/19* (2013.01); *B60W 40/105* (2013.01); *B60W 2420/54* (2013.01)

(58) Field of Classification Search
CPC . B60W 30/19; B60W 40/105; B60W 2420/54
USPC ........................................................ 701/1
See application file for complete search history.

(56) References Cited

U.S. PATENT DOCUMENTS

| 11,506,717 | B1* | 11/2022 | Maraaba | G01R 31/343 |
| 2003/0119448 | A1* | 6/2003 | Arntz | G01M 15/12 |
| | | | | 455/66.1 |
| 2003/0196492 | A1* | 10/2003 | Remboski | G01N 29/46 |
| | | | | 73/593 |
| 2008/0234964 | A1* | 9/2008 | Miyasaka | G01M 13/04 |
| | | | | 702/113 |
| 2010/0101310 | A1* | 4/2010 | Perie | G01M 15/042 |
| | | | | 73/114.25 |
| 2013/0008254 | A1* | 1/2013 | Heim | G01M 13/045 |
| | | | | 73/593 |
| 2013/0035832 | A1* | 2/2013 | Nozu | B60K 17/35 |
| | | | | 701/69 |

(Continued)

FOREIGN PATENT DOCUMENTS

| CN | 114464213 A | * | 5/2022 | ................ G06N 3/08 |
| CN | 114659616 A | * | 6/2022 | ............ B60W 30/19 |
| JP | 4529602 B2 | | 8/2010 | |

(Continued)

*Primary Examiner* — Richard A Goldman
(74) *Attorney, Agent, or Firm* — Oblon, McClelland, Maier & Neustadt, L.L.P.

(57) ABSTRACT

A data generation unit generates second abnormal sound data indicating a change in loudness of a sound each time a rotation state changes by a certain amount, based on first abnormal sound data that is data of an abnormal sound generated due to a rotary motion of a rotation device mounted on an object, and rotation data that is data relating to the rotary motion of the rotation device. The second abnormal sound data is input to a sound source estimation unit, and a certainty factor of being a sound source of the abnormal sound indicated by the second abnormal sound data is output to each of a plurality of parts mounted on a vehicle.

9 Claims, 11 Drawing Sheets

(56) References Cited

U.S. PATENT DOCUMENTS

| | | | |
|---|---|---|---|
| 2015/0349689 A1* | 12/2015 | Park | B60L 3/0061 |
| | | | 318/490 |
| 2016/0107162 A1* | 4/2016 | Busenhart | B02C 4/32 |
| | | | 241/25 |
| 2016/0347306 A1* | 12/2016 | Oyama | B60W 30/20 |
| 2017/0131172 A1* | 5/2017 | Son | G01M 13/028 |
| 2019/0114849 A1 | 4/2019 | Lee et al. | |
| 2019/0353563 A1* | 11/2019 | Nishino | G05B 23/02 |
| 2020/0096418 A1* | 3/2020 | Nowoisky | G01N 29/4418 |
| 2020/0118358 A1 | 4/2020 | Lee et al. | |
| 2020/0149993 A1* | 5/2020 | Feng | G01M 13/045 |
| 2020/0193291 A1 | 6/2020 | Lee et al. | |
| 2020/0193735 A1 | 6/2020 | Jung et al. | |
| 2020/0363296 A1 | 11/2020 | Westlund et al. | |
| 2020/0368755 A1* | 11/2020 | Gräber | B02C 25/00 |
| 2021/0041327 A1* | 2/2021 | Boston | G07C 3/06 |
| 2021/0239570 A1* | 8/2021 | Abboud | G06F 17/141 |
| 2021/0302269 A1* | 9/2021 | Tabata | G01M 15/12 |
| 2021/0366210 A1* | 11/2021 | Okuda | G07C 5/0833 |
| 2021/0396184 A1* | 12/2021 | Beck | F16H 1/28 |
| 2022/0041174 A1* | 2/2022 | Bunazawa | G06N 20/00 |
| 2022/0148347 A1* | 5/2022 | Nakano | G05B 23/0281 |
| 2022/0194382 A1* | 6/2022 | Takamoto | G01H 3/12 |
| 2022/0238133 A1* | 7/2022 | Ibaragi | G06V 10/761 |
| 2022/0316657 A1* | 10/2022 | Mary | F17C 13/04 |
| 2023/0036694 A1* | 2/2023 | Coughlan | G06Q 20/367 |
| 2023/0042787 A1* | 2/2023 | Sahara | G01M 99/00 |

FOREIGN PATENT DOCUMENTS

| | | | | |
|---|---|---|---|---|
| JP | 2020-95258 A | | 6/2020 | |
| JP | 2022055513 A | * | 4/2022 | B60W 40/12 |

\* cited by examiner

FIG. 11A

| TIME | t1 | t2 | t3 | t4 | t5 | t6 | t7 | t8 | t9 | ... | tN |
|---|---|---|---|---|---|---|---|---|---|---|---|
| FREQUENCY SOUND DATA | P1 | P2 | P3 | P4 | P5 | P6 | P7 | P8 | P9 | ... | PN |
| ROTATION DATA (ROTATION SPEED) | r1 | r2 | r3 | r4 | r5 | r6 | r7 | r8 | r9 | ... | rN |
| NUMBER OF TIMES OF ROTATION | R1=0 | R2=tr2 | R3=tr3 | R4=tr4 | R5=tr5 | R6=tr6 | R7=tr7 | R8=tr8 | R9=tr9 | ... | RN=trN |

FIG. 11B

| No. | 1 | 2 | 3 | 4 | 5 | 6 | ... |
|---|---|---|---|---|---|---|---|
| FREQUENCY SOUND DATA | P1 | P2 | P3 | P4 | P6 | P9 | ... |
| NUMBER OF TIMES OF ROTATION | 0 | R2 | R3 | R4 | R6 | R9 | ... |

…

SOUND SOURCE ESTIMATION SERVER, SOUND SOURCE ESTIMATION SYSTEM, SOUND SOURCE ESTIMATION DEVICE, AND SOUND SOURCE ESTIMATION METHOD

CROSS-REFERENCE TO RELATED APPLICATION

This application claims priority to Japanese Patent Application No. 2020-214363 filed on Dec. 23, 2020, incorporated herein by reference in its entirety.

BACKGROUND

1. Technical Field

The present disclosure relates to a technique for estimating a sound source of an abnormal sound generated due to a rotary motion of a rotation device mounted on an object.

2. Description of Related Art

In a case where any of a plurality of parts constituting a vehicle has abnormality, the vehicle may generate a sound (abnormal sound) different from an operation sound generated when the parts normally operate. In order to eliminate the abnormal sound, there is a need to identify a part that is a sound source of the abnormal sound from the parts and repair or replace the identified part. Therefore, in recent years, there has been proposed a technique for estimating the part that is the sound source of the abnormal sound by analyzing data of the abnormal sound.

In US 2019-0114849 A, a signal of an abnormal sound recorded by a microphone is transmitted to a server equipped with artificial intelligence. The server extracts reference data having characteristics similar to the received signal of the abnormal sound from a plurality of pieces of abnormal sound reference data stored in advance. After that, information on a sound source is output based on the extracted reference data.

SUMMARY

In a case where an abnormal sound is generated due to a rotary motion of a rotation device, the abnormal sound may change depending on a speed of the rotary motion. For example, in a case where a speed of the rotary motion is high, the abnormal sound is generated at a high frequency, and in a case where a speed of the rotary motion is low, the abnormal sound is generated at a low frequency.

In the related art, it is not considered that a generation frequency of the abnormal sound changes depending on the speed of the rotary motion. Therefore, there is a possibility that a server or the like for estimating a sound source estimates an abnormal sound at the time of high-speed rotation and an abnormal sound at the time of low-speed rotation that are caused by a certain part as a sound source, as an abnormal sound generated from different sound sources.

An object of the present disclosure is to provide a sound source estimation system, a sound source estimation device, or a sound source estimation method that suppresses estimation of different parts as a sound source depending on a speed of a rotary motion generated by a rotation device.

A first aspect of the present disclosure relates to a sound source estimation server including a data acquisition unit, a data generation unit, and a sound source estimation unit. The data acquisition unit is configured to acquire first abnormal sound data that is data indicating a loudness of a sound including an abnormal sound generated due to a rotary motion of a rotation device mounted on an object, and rotation data that is data relating to a rotation angle of the rotation device when the abnormal sound is generated. The data generation unit is configured to generate second abnormal sound data that is data indicating a loudness of a sound including the abnormal sound each time the rotation angle of the rotation device changes by a predetermined angle, based on the first abnormal sound data and the rotation data. The sound source estimation unit is configured to estimate which part of a plurality of parts mounted on the object is a sound source of the abnormal sound for the second abnormal sound data.

With the sound source estimation server, the second abnormal sound data that is data indicating a sound pressure each time the rotation angle of the rotation device changes by a predetermined angle is generated. A generation frequency of the abnormal sound with respect to the change in rotation angle is the same regardless of a speed of the rotary motion. Therefore, it is considered that even in a case where the speed of the rotary motion is different, the second abnormal sound data generated from the abnormal sound caused by the identical part as the sound source is the same data. With this, it is possible to suppress that different sound source estimation results are shown depending on the speed of the rotary motion.

In the sound source estimation server according to first aspect, the second abnormal sound data may be data indicating a loudness of a sound including the abnormal sound during a time when the rotation angle of the rotation device changes by a predetermined angle.

According to the first aspect, the rotation angle in the second abnormal sound data can be set to a predetermined angle. With this, the second abnormal sound data generated from the abnormal sound caused by the identical part as the sound source is more likely to be the same data. Therefore, it is possible to further suppress that different sound source estimation results are shown depending on the speed of the rotary motion.

In the sound source estimation server according to first aspect, the second abnormal sound data may be data indicating a loudness of a sound including the abnormal sound during a time when the rotation angle of the rotation device changes from a first state to a second state.

According to the first aspect, the rotation angle in the second abnormal sound data can be set to a predetermined state. With this, the second abnormal sound data generated from the abnormal sound caused by the identical part as the sound source is more likely to be the same data. Therefore, it is possible to further suppress that different sound source estimation results are shown depending on the speed of the rotary motion.

In the sound source estimation server according to first aspect, the second abnormal sound data may be data indicating a loudness of a sound including the abnormal sound each time the rotation angle changes by a certain angle.

According to the first aspect, the second abnormal sound data that is data indicating a change in sound pressure each time the rotation angle of the rotation device changes by a certain angle is generated. A generation frequency of the abnormal sound each time the rotation angle changes by a certain angle is the same regardless of the speed of the rotary motion. Therefore, even in a case where the speed of the rotary motion is different, the second abnormal sound data generated from the abnormal sound caused by the identical part as the sound source is the same data. With this, it is possible to suppress that different sound source estimation results are shown depending on the speed of the rotary motion.

In the sound source estimation server according to first aspect, the rotation data may include a rotation speed that is the number of times of rotation of the rotary motion per unit time, and the second abnormal sound data may be data indicating a loudness of a sound including the abnormal sound each time the number of times of rotation of the rotary motion changes by a certain number of times.

According to the first aspect, second abnormal sound data that is data indicating a change in sound pressure each time the number of times of rotation of the rotation device changes by a certain number of times is generated. A generation frequency of the abnormal sound each time the number of times of rotation changes by a certain number of times is the same regardless of the speed of the rotary motion. Therefore, even in a case where the speed of the rotary motion is different, the second abnormal sound data generated from the abnormal sound caused by the identical part as the sound source is the same data. With this, it is possible to suppress that different sound source estimation results are shown depending on the speed of the rotary motion by using the number of times of rotation.

In the sound source estimation server according to first aspect, the rotation data may include a rotation speed that is the number of times of rotation of the rotary motion per unit time, and a gear ratio of a gear-shift mechanism that shifts the rotary motion to output a gear-shift rotary motion, and the second abnormal sound data may be data indicating a loudness of a sound including the abnormal sound each time the number of times of rotation of the gear-shift rotary motion changes by a certain number of times.

According to the first aspect, second abnormal sound data that is data indicating a sound pressure of the abnormal sound each time the number of times of gear-shift rotation that is the number of times of rotation of the rotary motion shifted by the gear-shift mechanism changes by a certain number of times is generated. In a case where the abnormal sound is generated due to the rotary motion after the shift, a generation frequency of the abnormal sound each time the number of times of gear-shift rotation changes by a certain number of times is the same regardless of the speed of the rotary motion and the gear ratio. Therefore, even in a case where the speed of the rotary motion and the gear ratio are different, the second abnormal sound data generated from the abnormal sound caused by the identical part as the sound source is the same data. With this, it is possible to suppress that different sound source estimation results are shown depending on the speed of the rotary motion and the gear ratio.

A second aspect of the present disclosure relates to a sound source estimation system including a detection generation unit, a rotation data acquisition unit, a data generation unit, a data transmission unit, and a data receiver. The detection generation unit is configured to generate first abnormal sound data that is data indicating a loudness of a sound including an abnormal sound generated due to a rotary motion of a rotation device mounted on an object by detecting the sound including the abnormal sound. The rotation data acquisition unit is configured to acquire rotation data that is data relating to a rotation state of the rotation device when the abnormal sound is generated. The data generation unit is configured to generate second abnormal sound data that is data indicating a loudness of a sound including the abnormal sound each time a rotation angle of the rotation device changes by a predetermined angle, based on the first abnormal sound data and the rotation data. The data transmission unit is configured to transmit the second abnormal sound data to a server that estimates which part of a plurality of parts mounted on the object is a sound source of the abnormal sound for the second abnormal sound data. The data receiver is configured to receive information on the sound source from the server.

With the sound source estimation system, the second abnormal sound data that is data indicating a sound pressure each time the rotation angle of the rotation device changes by a predetermined angle is generated. A generation frequency of the abnormal sound each time the rotation angle changes by a predetermined angle is the same regardless of the speed of the rotary motion. Therefore, even in a case where the speed of the rotary motion is different, the second abnormal sound data generated from the abnormal sound caused by the identical part as the sound source is the same data. With this, it is possible to suppress that the server shows different sound source estimation results depending on the speed of the rotary motion.

A third aspect of the present disclosure relates to a sound source estimation device including a detection generation unit, a rotation data acquisition unit, a data generation unit, and a sound source estimation unit. The detection generation unit is configured to generate first abnormal sound data that is data indicating a loudness of a sound including an abnormal sound generated due to a rotary motion of a rotation device mounted on an object by detecting the sound including the abnormal sound. The rotation data acquisition unit is configured to acquire rotation data that is data relating to a rotation state of the rotation device when the abnormal sound is generated. The data generation unit is configured to generate second abnormal sound data that is data indicating a loudness of a sound including the abnormal sound each time a rotation angle of the rotation device changes by a predetermined angle, based on the first abnormal sound data and the rotation data. The sound source estimation unit is configured to estimate which part of a plurality of parts mounted on the object is a sound source of the abnormal sound for the second abnormal sound data.

With the sound source estimation device, the second abnormal sound data that is data indicating a sound pressure each time the rotation angle of the rotation device changes by a predetermined angle is generated. A generation frequency of the abnormal sound each time the rotation angle changes by a predetermined angle is the same regardless of the speed of the rotary motion. Therefore, even in a case where the speed of the rotary motion is different, the second abnormal sound data generated from the abnormal sound caused by the identical part as the sound source is the same data. With this, it is possible to suppress that different sound source estimation results are shown depending on the speed of the rotary motion.

A fourth aspect of the present disclosure relates to a sound source estimation method including a first abnormal sound data acquisition step of acquiring first abnormal sound data that is data indicating a loudness of a sound including an abnormal sound generated due to a rotary motion of a rotation device mounted on an object, a rotation data acquisition step of acquiring rotation data that is data relating to a rotation angle of the rotation device when the abnormal sound is generated, a data generation step of generating second abnormal sound data that is data indicating a loudness of a sound including the abnormal sound each time the rotation angle of the rotation device changes by a predetermined angle, based on the first abnormal sound data and the rotation data, and a sound source estimation step of estimating which part of a plurality of parts mounted on the object is a sound source of the abnormal sound for the second abnormal sound data.

With the sound source estimation method, the second abnormal sound data that is data indicating a sound pressure each time the rotation angle of the rotation device changes by a predetermined angle is generated. A generation frequency of the abnormal sound each time the rotation angle changes by a predetermined angle is the same regardless of the speed of the rotary motion. Therefore, even in a case where the speed of the rotary motion is different, the second abnormal sound data generated from the abnormal sound caused by the identical part as the sound source is the same data. With this, it is possible to suppress that different sound source estimation results are shown depending on the speed of the rotary motion.

According to the aspects of the present disclosure, it is possible to suppress that different results of the sound source estimation are shown depending on the speed of the rotary motion of the rotation device.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 11A is a table showing a change of frequency sound data with respect to the number of times of rotation;

FIG. 11B is a table showing the change of the frequency sound data with respect to the number of times of rotation;

DETAILED DESCRIPTION OF EMBODIMENTS

Figure 1:
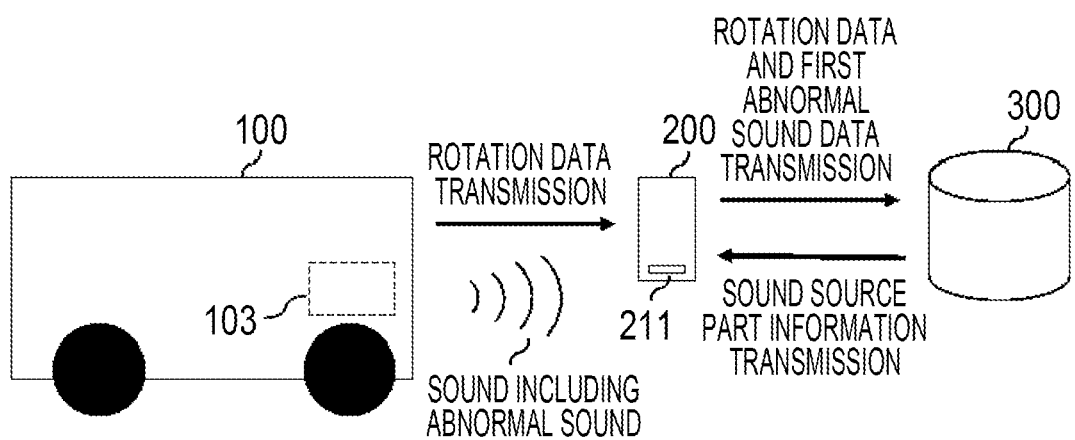
FIG. 1 is a diagram showing a vehicle, a portable terminal, and a server.

Hereinafter, embodiments of the present disclosure will be described in detail with reference to the drawings. Note that, in the drawings, the same or equivalent parts are denoted by the same reference numerals, and description thereof will not be repeated.

Embodiment 1

FIG. 1 is a diagram showing an outline of a vehicle 100, a portable terminal 200, and a server 300 that is a sound source estimation server according to Embodiment 1 of the present disclosure. In the present embodiment, the vehicle 100 is an object of sound source estimation.

The vehicle 100 includes an engine 103 that generates a rotary motion. In addition, a plurality of parts that moves in accordance with the rotary motion is mounted on the vehicle 100. Examples of the parts include a piston that reciprocates inside the engine 103, a camshaft that is rotated by power of the engine 103, an oil pump that is driven by the engine 103, and a plurality of gears that transmits the rotary motion generated from the engine 103. The parts generate an operation sound when moving in accordance with the rotary motion. However, in a case where any of the parts has abnormality, the vehicle 100 generates a sound (abnormal sound) different from an operation sound generated when the parts normally operate.

When a user of the vehicle 100 senses the generation of the abnormal sound, the user brings the vehicle 100 to a dealership or a maintenance facility. A worker in the dealership or the maintenance facility estimates a part that is a sound source of the abnormal sound from the parts mounted on the vehicle 100 by using the portable terminal 200.

The portable terminal 200 includes a microphone 211, detects a sound including the abnormal sound generated from the vehicle 100 due to the rotary motion, and generates first abnormal sound data that is data indicating a change of a sound pressure level of the sound including the abnormal sound with respect to a time. In addition, rotation data that is data relating to a rotation angle of the rotary motion generated from the engine 103 is transmitted from the vehicle 100 to the portable terminal 200.

The first abnormal sound data and the rotation data are transmitted from the portable terminal 200 to the server 300. The server 300 estimates which part of the parts mounted on the vehicle 100 is a sound source of the abnormal sound, based on the received first abnormal sound data and rotation data. Sound source part information as an estimation result is transmitted from the server 300 to the portable terminal 200.

A worker in the dealership or the maintenance facility confirms presence or absence of abnormality of the part estimated as the sound source of the abnormal sound, and repairs or replaces the part as needed, based on the sound source part information received by the portable terminal 200.

Figure 2:
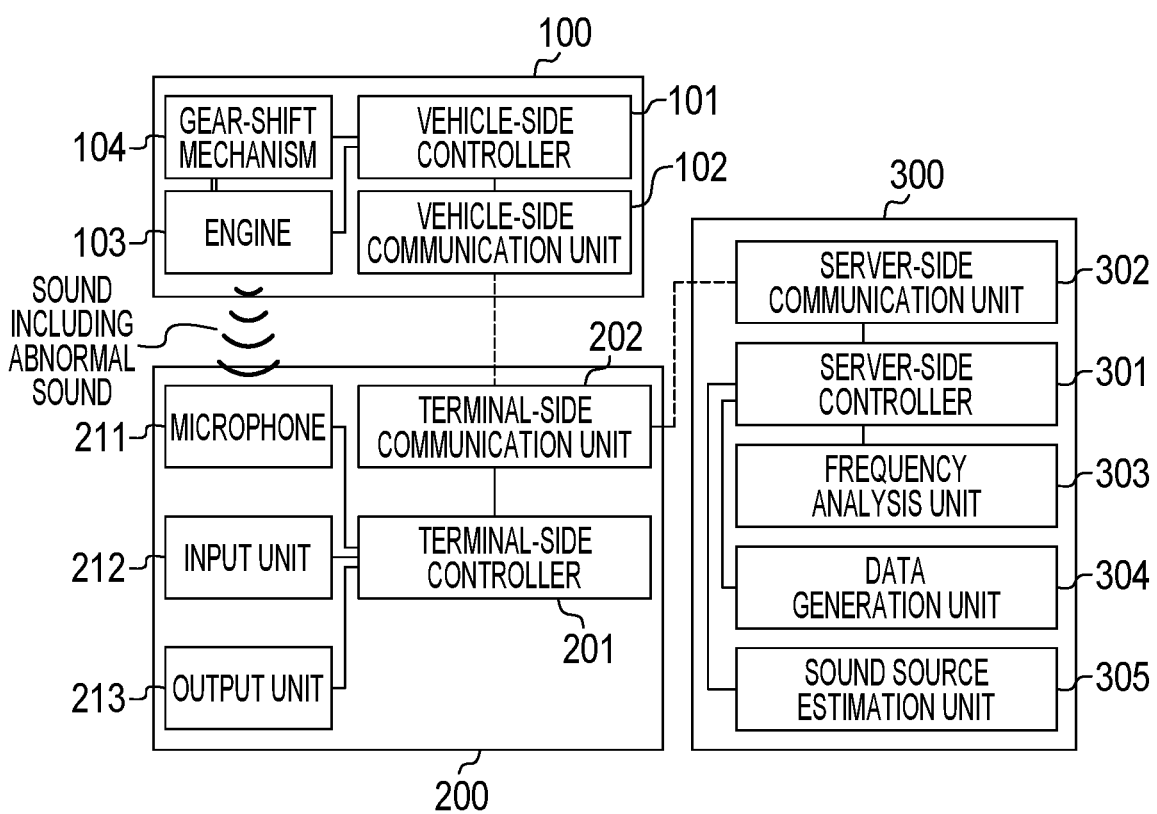
FIG. 2 is a diagram showing configurations of a vehicle, a portable terminal, and a server according to Embodiment 1.

FIG. 2 is a diagram showing configurations of the vehicle 100, the portable terminal 200, and the server 300.

The vehicle 100 includes a vehicle-side controller 101, a vehicle-side communication unit 102, an engine 103, and a gear-shift mechanism 104.

The engine 103 generates reciprocating motion of an internal piston by combusting fuel, such as gasoline. The engine 103 includes a crankshaft that converts the reciprocating motion into rotary motion and outputs the rotary motion.

The gear-shift mechanism 104 is composed of a gear, a shaft, or the like, converts a speed or torque of the rotary motion output from the crankshaft, and outputs the rotary motion with the converted speed or torque as a gear-shift rotary motion. The vehicle 100 travels by rotating wheels by the gear-shift rotary motion output from the gear-shift mechanism 104.

The vehicle-side controller 101 is composed of a microcomputer that controls the engine 103 and a microcomputer that controls the gear-shift mechanism 104. The vehicle-side controller 101 controls a timing of combustion of the engine 103, a gear ratio of the gear-shift mechanism 104, and the like based on a signal input from a sensor (not shown) provided in the engine 103 or the like and an operation of a driver of the vehicle 100. The signal input to the vehicle-side controller 101 includes a crank angle indicating a rotation angle of the crankshaft of the engine 103.

The vehicle-side communication unit 102 is a communication device that communicates with an outside of the vehicle 100. The vehicle-side controller 101 causes the vehicle-side communication unit 102 to transmit rotation data that is data relating to the crank angle to the outside of the vehicle 100.

In a case where any one of a plurality of parts mounted on the vehicle 100 has abnormality, the abnormal part moves in accordance with the rotary motion of the engine 103, and thus an abnormal sound caused by the abnormal part as a sound source is generated.

The portable terminal 200 includes a terminal-side controller 201, a terminal-side communication unit 202, a microphone 211, an input unit 212, and an output unit 213.

The microphone 211 is a detection generation unit that detects a sound around the portable terminal 200 and generates the first abnormal sound data. A user of the portable terminal 200, such as a worker in the dealership or the maintenance facility, brings the portable terminal 200 close to the brought vehicle 100, whereby the microphone 211 can detect a sound including an abnormal sound generated from the vehicle 100. The microphone 211 generates the first abnormal sound data that is data indicating a change of a sound pressure level of the sound including the abnormal sound with respect to a time, and outputs the first abnormal sound data to the terminal-side controller 201.

The input unit 212 receives an operation of the user of the portable terminal 200 and outputs a signal corresponding to the operation of the user to the terminal-side controller 201. As the input unit 212, a keyboard, a touch panel, a mouse, a voice recognition device, or the like is used.

The output unit 213 is a device that outputs information according to a signal input to the terminal-side controller 201 to the user of the portable terminal 200. As the output unit 213, a display device, such as a liquid crystal screen, a speaker that outputs voice, a printer that prints information on paper, or the like is used.

The terminal-side communication unit 202 is a device that communicates with an outside of the portable terminal 200. The terminal-side communication unit 202 is a rotation data acquisition unit that acquires rotation data by receiving the rotation data by communication with the vehicle-side communication unit 102. The terminal-side communication unit 202 receives the rotation data from the vehicle 100 simultaneously with the detection of the sound including the abnormal sound by the microphone 211. With this, it is possible to receive the rotation data for the same time as the time when the abnormal sound detected by the microphone 211 is generated.

Further, the terminal-side communication unit 202 transmits and receives data to and from the server 300 by communicating with the server 300. The communication between the terminal-side communication unit 202 and the vehicle 100 and the server 300 may be performed by wireless communication using radio waves or by wired communication using signal lines. In addition, a configuration may be adopted in which the terminal-side communication unit 202 uses different communication methods for the communication with the vehicle 100 and the communication with the server 300.

The terminal-side controller 201 controls the terminal-side communication unit 202, the microphone 211, and the output unit 213. The terminal-side controller 201 is composed of a central processing unit (CPU), a memory (read only memory (ROM) and a random access memory (RAM)), and the like, and the CPU executes processing based on a signal input from the input unit 212 or a program recorded in the ROM.

The server 300 includes a server-side controller 301, a server-side communication unit 302, a frequency analysis unit 303, a data generation unit 304, and a sound source estimation unit 305.

The server-side communication unit 302 is a communication device that performs transmission and reception of data by communicating with the terminal-side communication unit 202. The server-side communication unit 302 is a data acquisition unit that acquires data by receiving the first abnormal sound data and the rotation data from the portable terminal 200. In addition, the server-side communication unit 302 transmits sound source part information described below to the portable terminal 200.

The frequency analysis unit 303 generates, based on the first abnormal sound data, frequency sound data that is data indicating a change of a frequency spectrum of a sound including an abnormal sound with respect to a time.

The data generation unit 304 generates, based on the frequency sound data and the rotation data, second abnormal sound data that is data indicating a frequency spectrum of a sound including an abnormal sound each time the crank angle changes by a predetermined angle. The second abnormal sound data is data indicating the change of the frequency spectrum of the sound including the abnormal sound with respect to a change of the crank angle.

In a case where the abnormal sound is generated due to the rotary motion of the engine 103, at the time of low-speed rotation, a sound source part of the abnormal sound also moves at a low speed, so that the generation frequency of the abnormal sound is low. On the other hand, at the time of high-speed rotation, the sound source part of the abnormal sound also moves at a high speed, so that the generation frequency of the abnormal sound is high. Therefore, even though the abnormal sound is caused by the identical part as the sound source, the first abnormal sound data is different depending on the speed of the rotary motion.

However, the motion of the sound source part of the abnormal sound during a time when the crank angle changes by a predetermined angle is the same regardless of the speed of the rotary motion. Therefore, it is considered that the second abnormal sound data indicating the change of the frequency spectrum with respect to the change of the crank angle is the same data at the time of low-speed rotation and at the time of high-speed rotation. Details of a method of generating the second abnormal sound data will be described below.

The sound source estimation unit 305 performs learning by using convolutional neural network (CNN) so as to estimate which part of a plurality of parts mounted on the vehicle 100 causes the abnormal sound for the input second abnormal sound data. The sound source estimation unit 305 outputs, to each of the parts mounted on the vehicle 100, a certainty factor of being the sound source of the abnormal sound indicated by the input second abnormal sound data.

When the sound source estimation unit 305 performs learning, data in which an input value indicating the change of the frequency spectrum of the sound including the abnormal sound each time the crank angle changes by a predetermined angle as in the case of the second abnormal sound data and information on the sound source part of the abnormal sound indicated by the input value are labeled is used as teacher data. The sound source estimation unit 305 adjusts a parameter such that a certainty factor of the part labeled in the teacher data is higher than certainty factors of other parts in the output with respect to the input value of the teacher data.

The server-side controller 301 controls the server-side communication unit 302, the frequency analysis unit 303, the data generation unit 304, and the sound source estimation unit 305. The server-side controller 301, the frequency analysis unit 303, the data generation unit 304, and the sound source estimation unit 305 are composed of a CPU, a memory (ROM and RAM), and the like, and the CPU executes processing based on a program recorded in the ROM.

Figure 3:
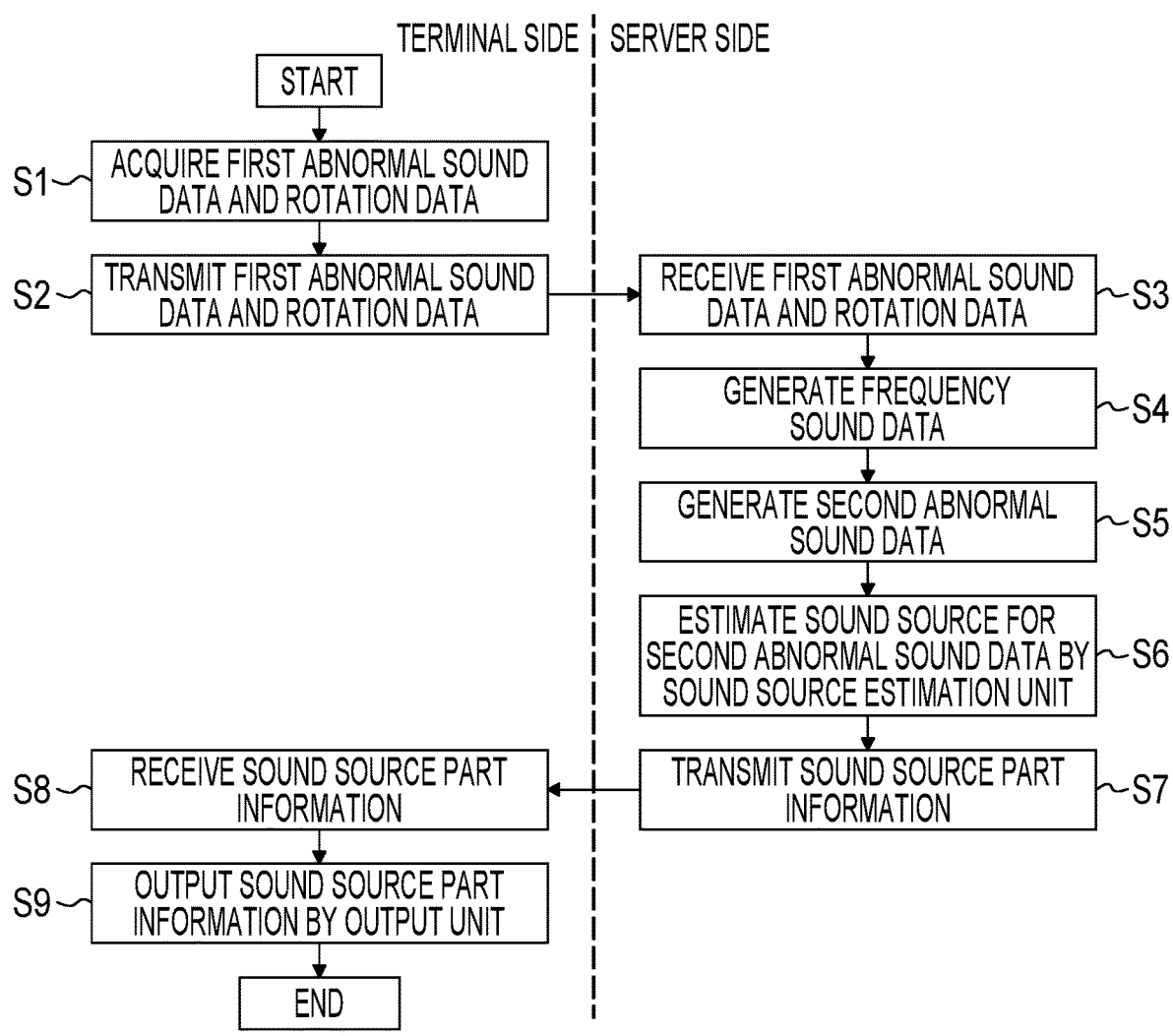
FIG. 3 is a flowchart showing a flow of sound source estimation according to Embodiment 1.

FIG. 3 is a flowchart showing a control flow of sound source estimation according to Embodiment 1 of the present disclosure.

The input unit 212 of the portable terminal 200 receives an operation for starting sound source estimation, thereby starting a flow of the present control.

Next, the input unit 212 receives an operation for detecting a sound. With this, the terminal-side controller 201 activates the microphone 211. In addition, the terminal-side controller 201 simultaneously activates the terminal-side communication unit 202, and the terminal-side communication unit 202 communicates with the vehicle-side communication unit 102 of the vehicle 100. When the portable terminal 200 is brought close to the vehicle 100 in a state where the microphone 211 is activated, a sound including an abnormal sound is detected by the microphone 211, and first abnormal sound data indicating the change of the sound pressure level of the sound including the abnormal sound with respect to a time is generated (S1). The terminal-side communication unit 202 receives rotation data from the vehicle 100 simultaneously with the detection of the sound by the microphone 211. The rotation data is data indicating a crank angle of the engine 103 at a time corresponding to a time when the sound including the abnormal sound is detected.

Next, the terminal-side controller 201 transmits the first abnormal sound data and the rotation data to the server 300 through the terminal-side communication unit 202 (S2). In the server 300, the server-side communication unit 302 receives the first abnormal sound data and the rotation data (S3).

The server-side controller 301 inputs the first abnormal sound data received by the server-side communication unit 302 to the frequency analysis unit 303 to generate frequency sound data (S4). The frequency analysis unit 303 performs a fast Fourier transform (FFT) on the first abnormal sound data for a predetermined time range centered on a certain time. With this, the frequency spectrum at the centered time is calculated. Then, the FFT is performed in the same manner by changing the centered time at certain time intervals. As a result, the frequency analysis unit 303 can generate the frequency sound data. In addition, the frequency analysis unit 303 may generate the frequency sound data by acquiring the sound pressure level of each band by using a plurality of band filters.

Subsequently, the server-side controller 301 inputs the frequency sound data and the rotation data to the data generation unit 304 to generate second abnormal sound data (S5). The frequency sound data is data indicating a change of a frequency spectrum of a sound including an abnormal sound with respect to a time, and the rotation data is data indicating a crank angle of the engine 103 at a time corresponding to the frequency sound data. Therefore, the second abnormal sound data can be generated by extracting a value of the sound pressure level each time the crank angle changes by a predetermined angle based on the frequency sound data and the rotation data. In the present embodiment, the predetermined angle is set to a certain angle A.

Figure 4A:
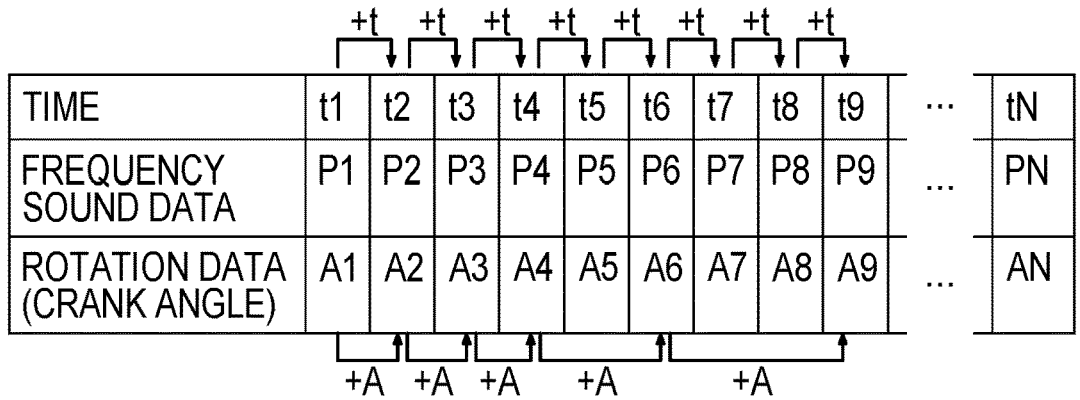
FIG. 4A is a table showing a change of frequency sound data with respect to a crank angle.
Figure 4B:
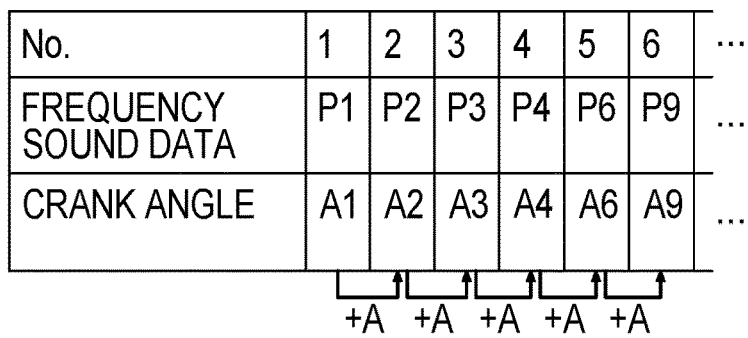
FIG. 4B is a table showing the change of frequency sound data with respect to a crank angle.

Details of the method of generating the second abnormal sound data by the data generation unit 304 will be described with reference to FIGS. 4A, 4B, and 5. FIG. 4A is a table showing frequency sound data and a crank angle included in rotation data. The frequency sound data is data indicating frequency spectra P1, P2, . . . , PN of a sound including an abnormal sound at times t1, t2, . . . , tN. Assumption is made that time intervals among t1, t2, . . . , tN are all equal to t. The rotation data is data indicating crank angles A1, A2, . . . , AN at t1, t2, . . . , tN. FIG. 4B shows data obtained by extracting the frequency spectra P1, P2, P3, P4, P6, P9, . . . , each time the crank angle changes by a certain angle A.

Figure 5:
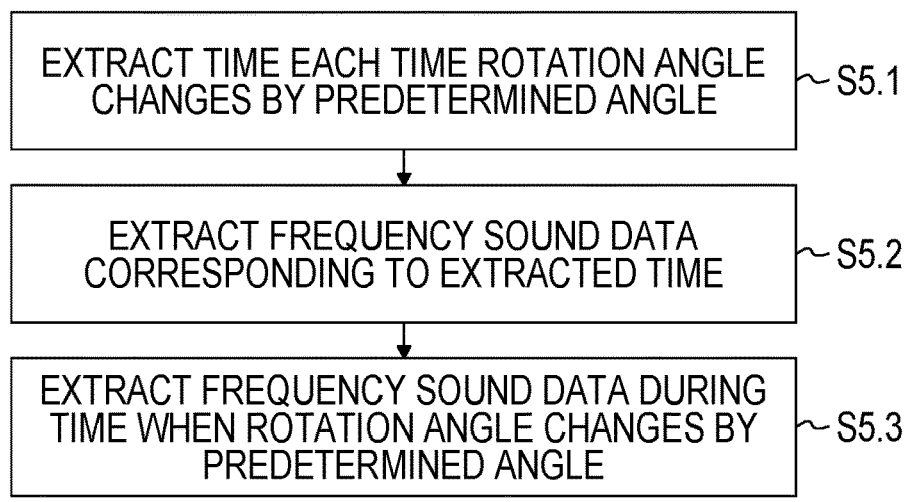
FIG. 5 is a flowchart showing a flow of generating second abnormal sound data.

FIG. 5 shows a flow of generating the second abnormal sound data by the data generation unit 304. First, the data generation unit 304 extracts the time and the crank angle each time the crank angle changes by a predetermined certain angle A (S5.1). The data in FIG. FIG. 4A is data in a case where the speed of the rotary motion decreases with the passage of time, and assumption is made that the crank angle changes by A each time the time changes from t1 to t2, from t2 to t3, from t3 to t4, from t4 to t6, and from t6 to t9. Accordingly, the crank angles A1, A2, A3, A4, A6, and A9 and corresponding times t1, t2, t3, t4, t6, and t9 are extracted. The same extraction is performed up to tN.

Next, the data generation unit 304 extracts sound pressure levels P1, P2, P3, P4, P6, P9, . . . , corresponding to the extracted times (S5.2). Here, depending on the state of the engine 103, data each time the crank angle A changes by a certain angle A may not be obtained. In this case, based on the sound pressure level at the crank angle around a target angle to be acquired, the sound pressure level at the target angle may be estimated. The data extracted in this way is as shown in FIG. 4B. With this, it is possible to extract the frequency spectrum of the sound including the abnormal sound each time the crank angle changes by a certain angle A. Here, the highest sound pressure level of the frequency sound data may be set to 1, and other sound pressure levels may be normalized.

The data generation unit 304 extracts a frequency spectrum during a time when the crank angle changes by n cycles and outputs the frequency spectrum as the second abnormal sound data (S5.3).

In a case where the abnormal sound is a sound generated due to the rotary motion of the engine 103, the generation frequency of the abnormal sound changes depending on the speed of the rotary motion. Therefore, in a case where the sound source estimation unit 305 estimates the first abnormal sound data detected from the vehicle 100, even though the abnormal sound is caused by the identical part as the sound source, there is a possibility that data at the time of high-speed rotation and data at the time of low-speed rotation are identified as different kinds of data. As a result, there is a concern that different parts may be estimated as the sound source depending on the speed of the rotary motion even though the abnormal sound is caused by the identical part as the sound source.

In the present embodiment, the data generation unit 304 generates the second abnormal sound data indicating the frequency spectrum each time the crank angle changes by a certain angle from the first abnormal sound data and the rotation data. Since such second abnormal sound data shows the change of the sound pressure level of the abnormal sound with respect to the crank angle, the data at the time of high-speed rotation and the data at the time of low-speed rotation show the same change. With this, it is possible to suppress that different results are shown depending on the speed of the rotary motion in the sound source estimation.

In the present embodiment, the frequency spectrum during a time when the crank angle changes by n cycles is used as the second abnormal sound data. The data during a time when a rotation state changes by a predetermined angle is used as the second abnormal sound data, whereby a possibility that the same second abnormal sound data is generated from the abnormal sound caused by the identical part as the sound source is increased.

On the other hand, even though the change of the frequency spectrum during a time when the crank angle changes by n cycles is used as the second abnormal sound data, there is a possibility that different data is obtained between a change of the frequency spectrum from a state where the crank angle is zero degrees and a change of the frequency spectrum from a state where the crank angle is 180 degrees. Therefore, the data during a time when the crank angle changes from a predetermined first state to a second state is used as the second abnormal sound data, whereby a possibility that the same data is acquired in a case where the abnormal sound is caused by the identical part as the sound source is further increased. For example, it is considered that the first state is a state where the crank angle is zero degrees, and the second state is a state where the crank angle is rotated by n cycles from the first state.

When the second abnormal sound data is generated, the server-side controller 301 inputs the generated second abnormal sound data to the sound source estimation unit 305, thereby estimating which part of a plurality of parts mounted on the vehicle 100 is the sound source of the abnormal sound for the second abnormal sound data (S6).

Figure 6:
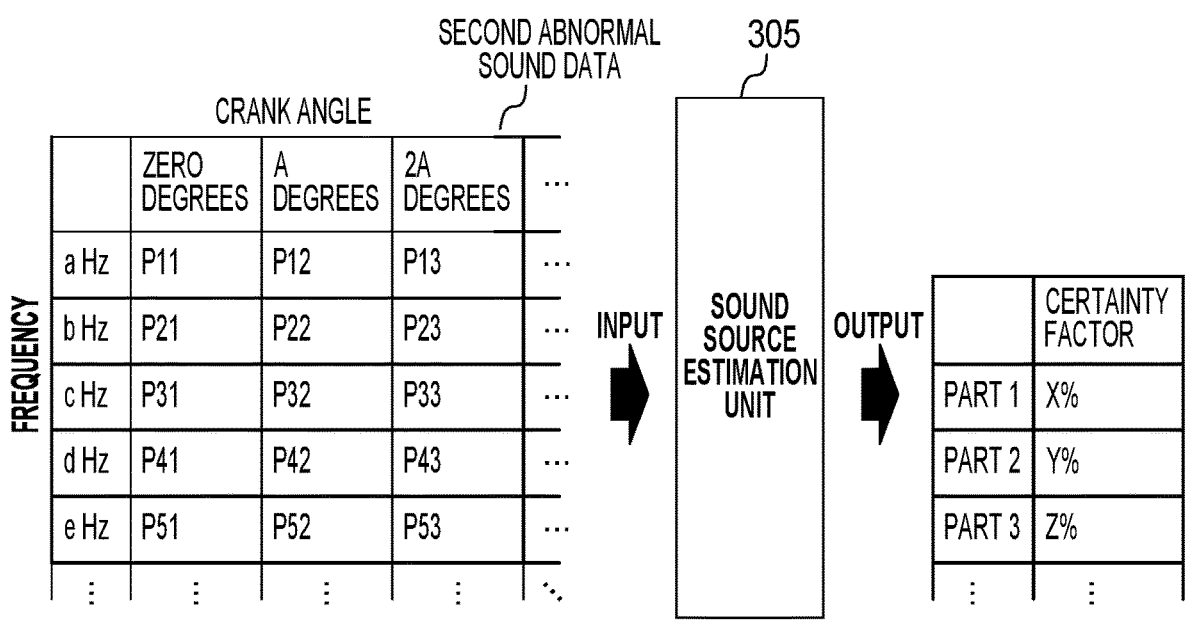
FIG. 6 is a diagram showing an outline of input and output for a sound source estimation unit.

FIG. 6 shows an outline of input and output for the sound source estimation unit 305. In the input second abnormal sound data, the vertical axis indicates a frequency of a Hz, b Hz, c Hz, d Hz, e Hz, . . . , and the horizontal axis indicates a crank angle of zero degrees, A degrees, 2A degrees, . . . . Assumption is made that the horizontal axis continues from the first state where the crank angle is zero degrees to the second state where the crank angle is rotated by n cycles from zero degrees. Sound pressure levels P11, P12, P13, . . . , are values indicating sound pressure levels of frequencies in the frequency spectrum P1 of FIG. 4A and FIG. 4B. Similarly, P21, P22, P23, . . . , and P31, P32, P33, . . . , are values indicating sound pressure levels of frequencies for each crank angle. When the second abnormal sound data is input to the sound source estimation unit 305, a certainty factor of being the sound source of the abnormal sound indicated by the second abnormal sound data is output to each of a part 1, a part 2, a part 3, . . . , mounted on the vehicle 100.

The server-side controller 301 transmits, through the server-side communication unit 302, sound source part information that is information on a part having a high certainty factor of being the sound source of the abnormal sound, to the portable terminal 200 as a result of sound source estimation (S7). The sound source part information may include information on a predetermined number of parts from the part having the highest certainty factor, or may include information on all parts having a certainty factor equal to or higher than a threshold value.

The portable terminal 200 receives the sound source part information by the terminal-side communication unit 202 (S8). When the terminal-side communication unit 202 receives the sound source part information, the terminal-side controller 201 causes the output unit 213 to output the information on the part included in the sound source part information (S9). For example, in a case where the output unit 213 is a liquid crystal screen, a name of the part, a shape of the part, a mounting position of the part, an inspection method of the part, a replacement method of the part, a repair method of the part, and the like are displayed on the liquid crystal screen. After the output unit 213 outputs the information, the present control ends.

With the above configuration, in a case where the abnormal sound is caused by the identical part as the sound source, the sound source estimation can be performed based on the same second abnormal sound data even in a case where the speed of the rotary motion is different. With this, it is possible to suppress that different sound source estimation results are shown depending on the speed of the rotary motion.

Embodiment 2

Figure 7:
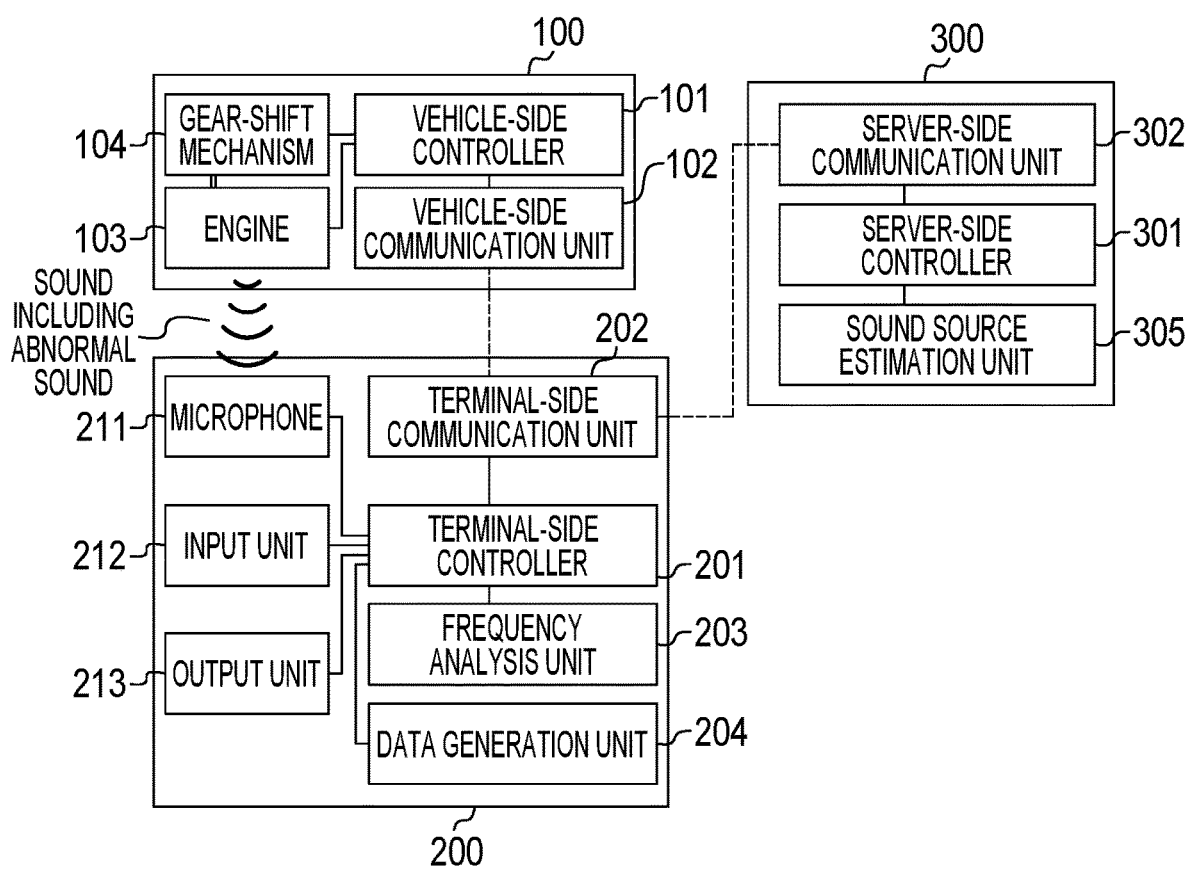
FIG. 7 is a diagram showing configurations of a vehicle, a portable terminal, and a server according to Embodiment 2.

FIG. 7 is a diagram showing configurations of the vehicle 100, the portable terminal 200 provided with a sound source estimation system, and the server 300 according to Embodiment 2 of the present disclosure.

In the present embodiment, a frequency analysis unit 203 and a data generation unit 204 are provided in the portable terminal 200 instead of the server 300. The frequency analysis unit 203 and the data generation unit 204 are controlled by the terminal-side controller 201.

Figure 8:
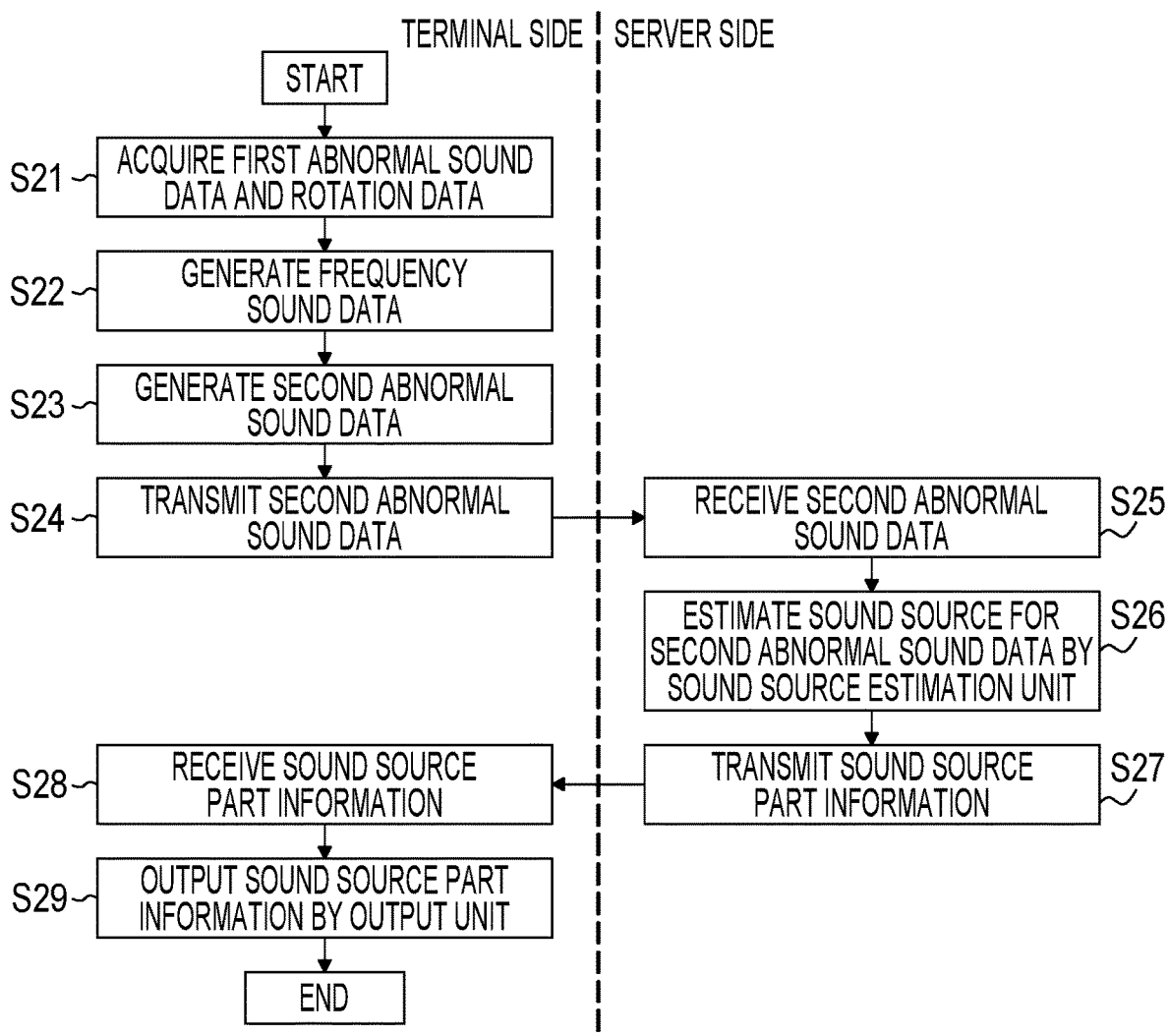
FIG. 8 is a flowchart showing a flow of sound source estimation according to Embodiment 2.

FIG. 8 is a flowchart showing a control flow of sound source estimation according to Embodiment 2.

The input unit 212 of the portable terminal 200 receives an operation relating to start of sound source estimation, thereby starting the present control. In S21, similarly to S1 of FIG. 3, the portable terminal 200 generates the first abnormal sound data from the sound including the abnormal sound detected by the microphone 211, and receives rotation data by using the terminal-side communication unit 202.

The terminal-side controller 201 inputs the first abnormal sound data to the frequency analysis unit 203 to generate frequency sound data (S22). Next, the terminal-side controller 201 inputs the frequency sound data and the rotation data to the data generation unit 204 to generate second abnormal sound data (S23).

The terminal-side controller 201 transmits the generated second abnormal sound data to the server 300 through the terminal-side communication unit 202 (S24). The server 300 receives the second abnormal sound data through the server-side communication unit 302 (S25). The server-side controller 301 inputs the second abnormal sound data to the sound source estimation unit 305. The sound source estimation unit 305 outputs, to a plurality of parts mounted on the vehicle 100, a certainty factor of being the sound source of the abnormal sound indicated by the second abnormal sound data (S26).

The server-side controller 301 transmits, through the server-side communication unit 302, sound source part information that is information on a part having a high certainty factor of being the sound source of the abnormal sound, to the portable terminal 200 (S27).

The portable terminal 200 receives the sound source part information by the terminal-side communication unit 202 (S28). When the terminal-side communication unit 202 receives the sound source part information, the terminal-side controller 201 causes the output unit 213 to output the information on the part included in the sound source part information (S29). After that, the present control ends.

The terminal-side communication unit 202 of the portable terminal 200 is a rotation data acquisition unit that acquires rotation data by receiving the rotation data from the vehicle 100, is a data transmission unit that transmits the second abnormal sound data to the server 300, and is a data acquisition unit that acquires information on a sound source from the server.

In the present embodiment, unlike Embodiment 1, the second abnormal sound data is generated on the portable terminal 200 side. With this, in a case where the abnormal sound is caused by the identical part as the sound source, the same second abnormal sound data is sent from the portable terminal 200 to the server 300 even in a case where the speed of the rotary motion is different. Therefore, even in a case where the server 300 does not have a function of generating the second abnormal sound data indicating the change of the abnormal sound with respect to the change of the rotation angle, such as the data generation unit 204, it is possible to suppress that different sound source estimation results are shown depending on the speed of the rotary motion.

Embodiment 3

Figure 9:
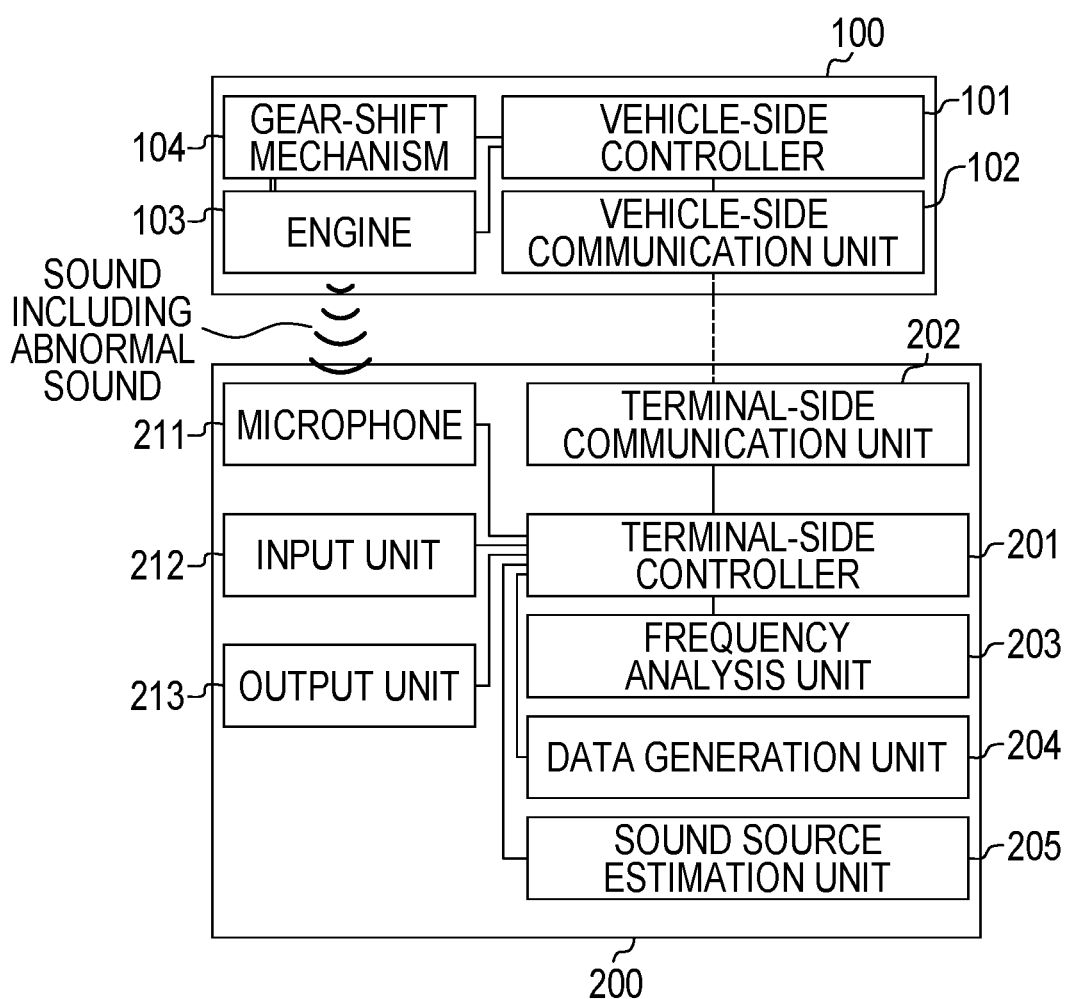
FIG. 9 is a diagram showing a vehicle and a portable terminal according to Embodiment 3.

FIG. 9 is a diagram showing configurations of the portable terminal 200 that is a sound source estimation device, and the vehicle 100 that is an object of sound source estimation according to Embodiment 3 of the present disclosure.

In the present embodiment, unlike Embodiment 1 and Embodiment 2, there is no server 300 for performing sound source estimation, and the portable terminal 200 includes the frequency analysis unit 203, the data generation unit 204, and a sound source estimation unit 205.

Figure 10:
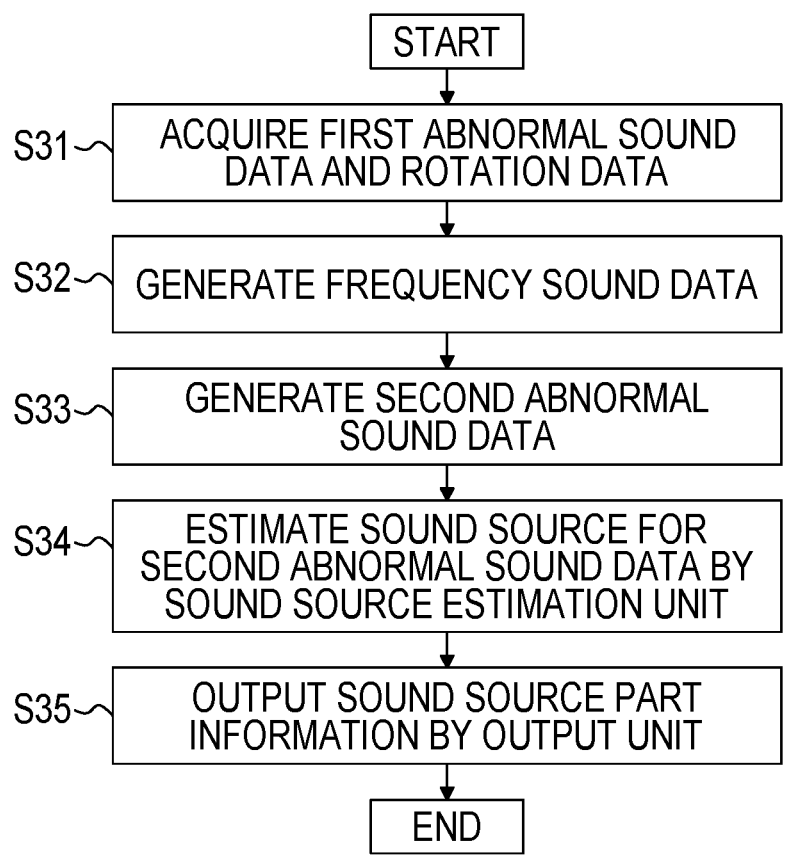
FIG. 10 is a flowchart showing a flow of sound source estimation according to Embodiment 3.

FIG. 10 is a flowchart showing a control flow of sound source estimation according to Embodiment 3.

The input unit 212 of the portable terminal 200 receives an operation relating to start of sound source estimation, thereby starting the present control. In S31, similarly to S1 of FIG. 3, the portable terminal 200 generates the first abnormal sound data from the sound including the abnormal sound detected by the microphone 211, and receives rotation data by using the terminal-side communication unit 202.

The terminal-side controller 201 inputs the first abnormal sound data to the frequency analysis unit 303 to generate frequency sound data (S32). Next, the terminal-side controller 201 inputs the frequency sound data and the rotation data to the data generation unit 204 to generate second abnormal sound data (S33).

The terminal-side controller 201 inputs the generated second abnormal sound data to the sound source estimation unit 205, whereby the sound source estimation unit 205 outputs, to a plurality of parts mounted on the vehicle 100, a certainty factor of being the sound source of the abnormal sound indicated by the second abnormal sound data (S34).

The terminal-side controller 201 causes the output unit 213 to output sound source part information that is information on a part having a high certainty factor of being the sound source of the abnormal sound (S35). After that, the present control ends.

In the present embodiment, unlike Embodiment 1 and Embodiment 2, the portable terminal 200 performs the generation of the second abnormal sound data and the estimation of the sound source. Therefore, it is possible to estimate the sound source of the abnormal sound without communicating with the server 300.

Modification Example

The second abnormal sound data is data indicating the change of the frequency spectrum of the sound including the abnormal sound each time the crank angle changes by a predetermined angle. In the above embodiment, the predetermined angle is set to a certain angle A. However, the second abnormal sound data may be generated by using another value as the predetermined angle.

For example, the predetermined angle may be set to an angle corresponding to a change of the number of times of rotation of the crankshaft by a certain number of times. The number of times of rotation is a value obtained by dividing an angular change of the crank angle by 360 degrees. In this case, the rotation data is a rotation speed that is the number of times of rotation of the crankshaft per unit time. The data generation unit 304 calculates the number of times of rotation from the rotation speed. After that, the data generation unit 304 extracts frequency sound data each time the number of times of rotation changes by a certain number of times (S5.1).

A method of calculating the number of times of rotation from the rotation speed and a method of extracting the frequency sound data each time the number of times of rotation changes by a certain number of times in the data generation unit 304 will be described with reference to FIGS. 11A and 11B.

The frequency sound data in FIG. 11A is data indicating frequency spectra $P_1, P_2, \ldots, P_N$ at times $t_1, t_2, \ldots, t_N$. The rotation data shows rotation speeds $r_1, r_2, \ldots, r_N$ of the crankshaft at times $t_1, t_2, \ldots, t_N$. The numbers of times of rotation $R_1, R_2, \ldots, R_N$ are values indicating the number of times of rotation of the crankshaft after time $t_1$ for each time. Assuming that the number of times of rotation $R_1$ at time $t_1$ is zero, the numbers of times of rotation $R_2, \ldots, R_N$ at times $t_2, \ldots, t_N$ are calculated as the product of a time interval t and rotation speeds $r_2, \ldots, r_N$. In addition, the number of times of rotation $R_2$ may be calculated as the product of an average value of $r_1$ and $r_2$ and the time interval t. In this case, the numbers of times of rotation $R_3, \ldots, R_N$ are similarly calculated as the product of an average value of the rotation speeds at two times and the time interval t.

Note that the rotation data is not limited to a configuration in which separate values are acquired for each of times $t_1, t_2, \ldots, t_N$. In a case where the rotation speed of the engine 103 is controlled to be constant during a time when the abnormal sound is detected, one rotation speed may be acquired and a value of the rotation speed may be applied to all of $r_1, r_2, \ldots, r_N$.

After the numbers of times of rotation $R_1, R_2, \ldots, R_N$ are calculated, the frequency sound data each time the number of times of rotation changes by a certain number of times R is extracted using the methods of S5.1 to S5.3 shown in FIG. 5. The extracted frequency sound data is shown in FIG. 11B. After that, the pieces of frequency sound data until the number of times of rotation reaches n times are extracted to generate the second abnormal sound data.

With this, even in a case where the crank angle for each of times t1, t2, . . . , tN cannot be acquired as the rotation data, the number of times of rotation can be estimated to generate the second abnormal sound data.

It is considered that in a case where the abnormal sound is generated due to the gear-shift rotary motion output from the gear-shift mechanism 104, the abnormal sound is generated at different frequencies depending on the gear ratio even though the sound source part and the speed of the rotary motion are the same.

Therefore, a case is considered in which the predetermined angle is set to an angle corresponding to a change of the number of times of gear-shift rotation that is the number of times of rotation of the gear-shift rotary motion by a certain number of times. In this case, the rotation data is the rotation speed and the gear ratio of the gear-shift mechanism 104. Here, the gear ratio is a ratio of the rotation speed of the rotary motion output from the engine 103 to the rotation speed of the gear-shift rotary motion output from the gear-shift mechanism 104. In this case, the data generation unit 304 calculates the number of times of gear-shift rotation from the rotation speed and the gear ratio as the rotation data, and then extracts the frequency sound data each time the number of times of gear-shift rotation changes by a certain number of times (S5.1).

Figure 12A:
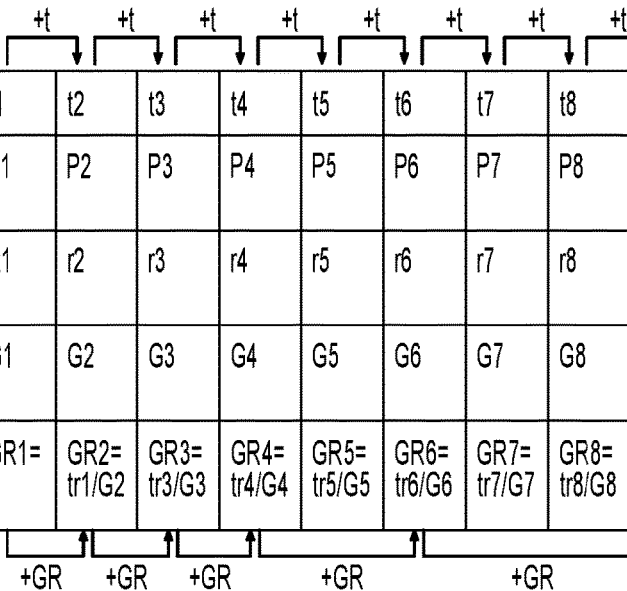
FIG. 12A is a table showing a change of frequency sound data with respect to the number of times of gear-shift rotation.

The frequency sound data in FIG. 12A is data indicating frequency spectra P1, P2, . . . , PN at times t1, t2, . . . , tN. The rotation data shows rotation speeds r1, r2, . . . , rN of the crankshaft and gear ratios G1, G2, . . . , GN at times t1, t2, . . . , tN. The numbers of times of gear-shift rotation GR1, GR2, . . . , GRN are values indicating the number of times of gear-shift rotation after time t1 for each of times t1, t2, . . . , tN. Assuming that the number of times of gear-shift rotation GR1 at time t1 is zero, the numbers of times of gear-shift rotation GR2, . . . , GRN at times t2, . . . , tN are calculated as values obtained by dividing the product of the rotation speeds r2, . . . , rN and a time interval t by the gear ratios G2, . . . , GN.

Figure 12B:
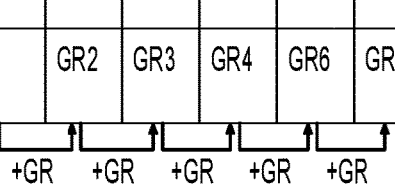
FIG. 12B is a table showing the change of the frequency sound data with respect to the number of times of gear-shift rotation.

After the numbers of times of gear-shift rotation GR1, GR2, . . . , GRN are calculated, the frequency sound data each time the number of times of gear-shift rotation changes by a certain number of times GR is extracted using the methods of S5.1 to S5.3 shown in FIG. 5. The extracted frequency sound data is shown in FIG. 12B. After that, the pieces of frequency sound data until the number of times of gear-shift rotation reaches n times are extracted to generate the second abnormal sound data. With this, it is possible to suppress the generation of different second abnormal sound data in a case where different gear ratios are generated due to the abnormal sound generated from the identical part.

In Embodiment 1, one server 300 includes the data generation unit 304 that generates the second abnormal sound data and the sound source estimation unit 305 that estimates the sound source of the second abnormal sound data. However, a configuration may be adopted in which two different servers may take charge of the data generation unit 304 and the sound source estimation unit 305 respectively and the two servers perform transmission and reception of data through communication to perform the sound source estimation. That is, the sound source estimation server may be constituted by a plurality of servers.

In Embodiment 2, the portable terminal 200 generates the first abnormal sound data by detecting the sound including the abnormal sound by the microphone 211, receives the rotation data by the terminal-side communication unit 202, and generates the second abnormal sound data by the data generation unit 204. However, the portable terminal 200 may generate the first abnormal sound data and receive the rotation data, transmit the first abnormal sound data and the rotation data to a server for data generation provided with the data generation unit 204, generate the second abnormal sound data by the server for data generation, and then transmit the second abnormal sound data to a server for sound source estimation. That is, the sound source estimation system may be constituted so as to be shared between the portable terminal 200 and the server for data generation.

In the above embodiment, the generation of the first abnormal sound data by detecting the sound including the abnormal sound by the microphone 211, and the reception of the rotation data by the terminal-side communication unit 202 are simultaneously performed. However, the generation of the first abnormal sound data and the reception of the rotation data need not necessarily be performed simultaneously. For example, a configuration may be adopted in which the terminal-side controller 201 records a time when the sound including the abnormal sound is detected by the microphone 211 with a timer or the like, the terminal-side communication unit 202 transmits the time when the abnormal sound is detected to the vehicle 100, and the vehicle-side controller 101 transmits, from among the pieces of rotation data recorded in a recording device, the rotation data corresponding to the time when the sound including the abnormal sound is detected to the portable terminal 200 or the server 300 through the vehicle-side communication unit 102. The rotation data of the time corresponding to the time when the abnormal sound is generated can also be acquired by this method.

In the above embodiment, when the server 300 acquires the first abnormal sound data and the rotation data, or the second abnormal sound data, the server-side communication unit 302 receives the data. However, the method of acquiring the data is not limited to the method performed by communication. For example, in the portable terminal 200, the first abnormal sound data and the rotation data, or the second abnormal sound data may be recorded in an external recording device, and the server 300 may read the recording device, thereby acquiring the data. Similarly, when the portable terminal 200 acquires the rotation data from the vehicle 100, the method is not limited to the method performed by communication.

In the above embodiment, the portable terminal 200 is a device outside the vehicle 100. However, the portable terminal 200 may be a device mounted on the vehicle 100. Communication between the vehicle-side communication unit 102 and the terminal-side communication unit 202 is performed using communication (CAN communication or the like) inside the vehicle 100. In this case, the terminal-side communication unit 202 does not have a communication function with the outside of the vehicle 100, and the vehicle-side communication unit 102 may transmit the first abnormal sound data and rotation data, or the second abnormal sound data to the server 300.

In addition, in the above embodiment, the portable terminal 200 that transmits the first abnormal sound data and the rotation data or transmits the second abnormal sound data receives the sound source part information. However, the portable terminal 200 may transmit the first abnormal sound data and the rotation data, or transmit the second abnormal sound data, and the sound source part information may be received by another device. For example, the first abnormal sound data and the rotation data are acquired by using the portable terminal 200 at the dealership or the maintenance facility where the vehicle 100 is brought, and the first abnormal sound data and the rotation data are transmitted to the server 300. After that, the sound source part information may be transmitted from the server 300 to a management server or the like that manages the work in the dealership or the maintenance facility.

In the above embodiment, an object for which sound source estimation is performed is the vehicle 100, but the object is limited to the vehicle 100 as long as the object includes the rotation device and a plurality of parts that moves in accordance with the rotary motion of the rotation device. For example, an aircraft that rotates a propeller by a rotation device, a ship that rotates a screw, or the like may be an object of sound source estimation. In addition, the rotation device is not limited to an internal combustion engine, such as the engine 103, as long as the rotation device is a device that generates the rotary motion, and may be, for example, a motor.

In the above embodiment, the first abnormal sound data is data indicating a change of the sound pressure level of the sound including the abnormal sound with respect to a time. However, the first abnormal sound data may be data indicating a change of the frequency spectrum with respect to a time. In addition, in the above embodiment, the second abnormal sound data is data indicating the frequency spectrum of the sound including the abnormal sound each time the rotation angle of the rotation device changes by a predetermined angle. However, the second abnormal sound data may be data indicating the sound pressure level each time the rotation angle of the rotation device changes by a predetermined angle.

In the above embodiment, the loudness of the sound is indicated by the sound pressure level. However, the loudness of the sound may be indicated by a value of pressure or a sensory amount expressed in units of phon or sone.

The embodiments disclosed herein are also intended to be combined as appropriate for implementation. It should be understood that the embodiments disclosed herein are merely illustrative and not restrictive in all respects. The scope of the present disclosure is defined by the terms of the claims, rather than the above description of the embodiment, and is intended to include any modifications within the scope and meaning equivalent to the terms of the claims.

What is claimed is:

1. A sound source estimation server comprising:
a communication interface configured to acquire first abnormal sound data indicative of a loudness of a sound including an abnormal sound generated due to a rotary motion of a rotation device mounted on an object, and rotation data that is data relating to a rotation angle of the rotation device when the abnormal sound is generated; and
circuitry configured to:
generate second abnormal sound data that is data indicating a loudness of a sound including the abnormal sound with respect to the rotation angle of the rotation device, based on the first abnormal sound data and the rotation data; and
estimate which part of a plurality of parts mounted on the object is a sound source of the abnormal sound for the second abnormal sound data.

2. The sound source estimation server according to claim 1, wherein the second abnormal sound data is data indicating a loudness of a sound including the abnormal sound during a time when the rotation angle of the rotation device changes by n cycles.

3. The sound source estimation server according to claim 1, wherein the second abnormal sound data is data indicating a loudness of a sound including the abnormal sound during a time when the rotation angle of the rotation device changes from a first state to a second state.

4. The sound source estimation server according to claim 1, wherein the second abnormal sound data is data indicating a loudness of a sound including the abnormal sound each time the rotation angle of the rotation device changes by a predetermined angle.

5. The sound source estimation server according to claim 1, wherein:
the rotation data includes a rotation speed that is a number rotations detected per unit time; and
the second abnormal sound data is data indicating a loudness of a sound including the abnormal sound each time the number of rotations changes by a certain number of times.

6. The sound source estimation server according to claim 1, wherein:
the rotation data includes a rotation speed that is a number of rotations detected per unit time, and a gear ratio of a gear-shift mechanism that shifts the rotary motion to output a gear-shift rotary motion that is a rotary motion obtained by converting the rotary motion of the rotation device with the gear-shift mechanism; and
the second abnormal sound data is data indicating a loudness of a sound including the abnormal sound each time a number rotations of the gear-shift rotary motion changes by a certain number of times.

7. A sound source estimation system comprising:
a microphone configured to generate first abnormal sound data indicative of a loudness of a sound including an abnormal sound generated due to a rotary motion of a rotation device mounted on an object by detecting the sound including the abnormal sound;
a communication interface configured to acquire rotation data that is data relating to a rotation state of the rotation device when the abnormal sound is generated; and
circuitry configured to generate second abnormal sound data that is data indicating a loudness of a sound including the abnormal sound each time the rotation angle of the rotation device changes by a predetermined angle, based on the first abnormal sound data and the rotation data,
wherein the communication interface is configured to:
transmit the second abnormal sound data to a server that estimates which part of a plurality of parts mounted on the object is a sound source of the abnormal sound for the second abnormal sound data; and
receive information on the sound source from the server.

8. A sound source estimation device comprising:
a microphone configured to generate first abnormal sound data indicative of a loudness of a sound including an abnormal sound generated due to a rotary motion of a rotation device mounted on an object by detecting the sound including the abnormal sound;
a communication interface configured to acquire rotation data that is data relating to a rotation state of the rotation device when the abnormal sound is generated; and
circuitry configured to:
generate second abnormal sound data that is data indicating a loudness of a sound including the abnormal sound each time the rotation angle of the rotation device changes by a predetermined angle, based on the first abnormal sound data and the rotation data; and estimate which part of a plurality of parts mounted on the object is a sound source of the abnormal sound for the second abnormal sound data.

9. A sound source estimation method comprising:

acquiring first abnormal sound data that is data indicating a loudness of a sound including an abnormal sound generated due to a rotary motion of a rotation device mounted on an object;

acquiring rotation data that is data relating to a rotation angle of the rotation device when the abnormal sound is generated;

generating second abnormal sound data that is data indicating a loudness of a sound including the abnormal sound each time the rotation angle of the rotation device changes by a predetermined angle, based on the first abnormal sound data and the rotation data; and estimating which part of a plurality of parts mounted on the object is a sound source of the abnormal sound for the second abnormal sound data.

\* \* \* \* \*